(12) United States Patent
Kakihara (10) Patent No.: US 11,137,066 B2
(45) Date of Patent: Oct. 5, 2021

(54) SPEED CHANGE CONTROL APPARATUS FOR AUTOMATIC TRANSMISSION

(71) Applicant: SUBARU CORPORATION, Tokyo (JP)

(72) Inventor: Yusuke Kakihara, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/898,147

(22) Filed: Jun. 10, 2020

(65) Prior Publication Data
US 2021/0062913 A1 Mar. 4, 2021

(30) Foreign Application Priority Data
Aug. 28, 2019 (JP) .............................. JP2019-156147

(51) Int. Cl.
*F16H 59/48* (2006.01)
*F16H 59/02* (2006.01)
(Continued)

(52) U.S. Cl.
CPC ......... *F16H 59/48* (2013.01); *F16H 59/0204* (2013.01); *F16H 59/08* (2013.01);
(Continued)

(58) Field of Classification Search
CPC ...... F16H 59/0204; F16H 59/48; F16H 59/08; F16H 59/44; F16H 59/54; F16H 59/66;
(Continued)

(56) References Cited

U.S. PATENT DOCUMENTS 6,003,396 A * 12/1999 Bellinger ............ F16H 61/0213
477/120
6,023,647 A * 2/2000 Saito ..................... B60W 30/18
477/107

(Continued)

FOREIGN PATENT DOCUMENTS

JP 2006-258125 A 9/2006

*Primary Examiner* — Edwin A Young
(74) *Attorney, Agent, or Firm* — McGinn IP Law Group, PLLC (57) ABSTRACT

A speed change control apparatus includes a shifting operation unit, a speed change controller, a deceleration detector, a gradient acquiring unit, and an allowable revolution number setting unit. The speed change controller changes the speed ratio of the automatic transmission on the basis of a shifting operation received by the shifting operation unit. In a case where the shifting operation unit receives a downshift request during deceleration of the vehicle, the allowable revolution number setting unit sets high-speed downshift allowable revolution number on the basis of the deceleration rate of the vehicle detected by the deceleration detector and the road-surface gradient acquired by the allowable revolution number setting unit. The speed change controller executes downshifting in a case where: the shifting operation unit receives the downshift request during the deceleration of the vehicle; and engine revolution number becomes equal to or smaller than the high-speed downshift allowable revolution number.

20 Claims, 5 Drawing Sheets

(51) Int. Cl.
*F16H 59/44* (2006.01)
*F16H 59/66* (2006.01)
*F16H 59/72* (2006.01)
*F16H 59/70* (2006.01)
*F16H 59/54* (2006.01)
*F16H 59/08* (2006.01)
*F16H 59/36* (2006.01)

(52) U.S. Cl.
CPC ............ *F16H 59/44* (2013.01); *F16H 59/54* (2013.01); *F16H 59/66* (2013.01); *F16H 59/70* (2013.01); *F16H 59/72* (2013.01); *F16H 2059/0239* (2013.01); *F16H 2059/082* (2013.01); *F16H 2059/366* (2013.01); *F16H 2059/663* (2013.01); *F16H 2059/706* (2013.01)

(58) Field of Classification Search
CPC .... F16H 59/70; F16H 59/72; F16H 2059/663; F16H 2059/082; F16H 2059/366; F16H 2059/706; F16H 2059/0239; F16H 61/0204; F16H 61/0248; F16H 61/08; F16H 61/16; F16H 2061/166; F16H 2312/18
See application file for complete search history.

(56) References Cited

U.S. PATENT DOCUMENTS

| | | | |
|---|---|---|---|
| 2017/0146116 A1* | 5/2017 | Lowndes | B60W 30/143 |
| 2019/0040946 A1* | 2/2019 | Wright | F16H 61/0213 |

* cited by examiner

[ACCEPTABLE-CANCELLATION-TIME TABLE]

| OIL TEMPERATURE To (°C) | ⇐ LOW . . . . . . . HIGH ⇒ |
|---|---|
| ACCEPTABLE CANCELLATION TIME (ms) | ⇐ LONG . . . . . . . SHORT ⇒ |

SPEED CHANGE CONTROL APPARATUS FOR AUTOMATIC TRANSMISSION

CROSS-REFERENCE TO RELATED APPLICATIONS

The present application claims priority from Japanese Patent Application No. 2019-156147 filed on Aug. 28, 2019, the entire contents of which are hereby incorporated by reference.

BACKGROUND

The technology relates to a speed change control apparatus for an automatic transmission, particularly to a speed change control apparatus for an automatic transmission operatable in an automatic speed change mode and a manual speed change mode.

An automatic transmission for a vehicle that is operatable in an automatic speed change mode and a manual speed change mode has been widely put to practical use. In the automatic speed change mode, the speed ratio is automatically adjusted on the basis of a predetermined speed change characteristic. In the manual speed change mode, the speed ratio is adjusted in accordance with manual operations by the driver.

For example, when the driver tries to execute downshifting by operating a shift lever or a paddle shift with depressing a brake pedal (i.e., during the deceleration of the vehicle) in the manual speed change mode, the downshifting can be prohibited from being executed in a high engine revolution range to suppress an over-revolution of the engine. The downshifting can be executed after the engine revolution number falls below downshift allowable revolution number due to deceleration of the vehicle. In other words, the downshifting can be executed with a delay. In such a case, a time gap can be generated between an actual execution of the downshifting and the driver's intention to execute the downshifting, making the driver have a feeling of strangeness.

When the vehicle is decelerating at a remarkably high deceleration rate (e.g., during rapid deceleration), the vehicle speed can be significantly decreased during the speed change, i.e., from the start of the downshifting to the completion of the downshifting. This can cause an excessive decrease in the number of revolutions of the engine at the completion of the downshifting. For example, when the vehicle is driven on a circuit in a sport traveling mode, the driver can find difficulty in keeping a desired high engine speed.

To address such a concern, Japanese Unexamined Patent Application Publication (JP-A) No. 2006-258125, for example, discloses a speed change control apparatus that executes a speed change with keeping the engine revolution number within a high revolution range. For example, when the deceleration rate of the vehicle is high, the speed change control apparatus increases the downshift allowable revolution number in consideration of a decrease in the engine revolution number during the speed change, thereby advancing the timing of the permission for the downshifting (i.e., expediting the execution of the downshifting). Such a speed change control apparatus makes it possible to execute the speed change with keeping the engine revolution number within a high revolution range. In other words, a significant decrease in the engine revolution number below the downshift allowable revolution number is suppressed after the execution of the downshifting.

SUMMARY

An aspect of the technology provides a speed change control apparatus for an automatic transmission configured to selectively switch between a plurality of speed change modes including an automatic speed change mode in which an automatic speed change is executed on the basis of a predetermined speed change characteristic and a manual speed change mode in which a manual speed change is executed on the basis of a shifting operation performed by a driver of a vehicle. The speed change control apparatus includes a shifting operation unit, a speed change controller, a deceleration detector, a gradient acquiring unit, and an allowable revolution number setting unit. The shifting operation unit is configured to receive the shifting operation performed by the driver while the manual speed change mode is being selected. The speed change controller is configured to change a speed ratio of the automatic transmission on the basis of the shifting operation received by the shifting operation unit. The deceleration detector is configured to detect a deceleration rate of the vehicle. The gradient acquiring unit is configured to acquire a gradient of a road surface of a road on which the vehicle is traveling. The allowable revolution number setting unit is configured to set high-speed downshift allowable revolution number on the basis of the deceleration rate of the vehicle and the gradient of the road surface in a case where the shifting operation unit receives the shifting operation that requests downshifting during deceleration of the vehicle. The high-speed downshift allowable revolution number is engine revolution number at which the downshifting is allowed to be executed during the deceleration of the vehicle. The speed change controller is configured to execute the downshifting in a case where: the shifting operation unit receives the shifting operation that requests the downshifting during the deceleration of the vehicle; and the engine revolution number becomes equal to or smaller than the high-speed downshift allowable revolution number.

An aspect of the technology provides a speed change control apparatus for an automatic transmission configured to selectively switch between a plurality of speed change modes including an automatic speed change mode in which an automatic speed change is executed on the basis of a predetermined speed change characteristic and a manual speed change mode in which a manual speed change is executed on the basis of a shifting operation performed by a driver of a vehicle. The speed change control apparatus includes a shifting operation unit, a speed change controller, a deceleration detector, an allowable revolution number setting unit, and a state transition determining unit. The shifting operation unit is configured to receive the shifting operation performed by the driver while the manual speed change mode is being selected. The speed change controller is configured to change a speed ratio of the automatic transmission on the basis of the shifting operation received by the shifting operation unit. The deceleration detector is configured to detect a deceleration rate of the vehicle. The allowable revolution number setting unit is configured to set high-speed downshift allowable revolution number on the basis of the deceleration rate of the vehicle in a case where the shifting operation unit receives the shifting operation that requests downshifting during deceleration of the vehicle. The high-speed downshift allowable revolution number is engine revolution number at which the downshifting is allowed to be executed during the deceleration of the vehicle. The state transition determining unit is configured to determine, on the basis of a driving state of the vehicle, whether the vehicle is making a transition from a deceleration state to an acceleration state. The speed change controller is configured to execute the downshifting in a case where: the shifting operation unit receives the shifting operation that requests the downshifting during the deceleration of the vehicle; and the engine revolution number becomes equal to or smaller than the high-speed downshift allowable revolution number, and cancel the downshifting being executed in a case where the state transition determining unit determines that the transition from the deceleration state to the acceleration state is made during execution of the downshifting.

An aspect of the technology provides a speed change control apparatus for an automatic transmission configured to selectively switch between a plurality of speed change modes including an automatic speed change mode in which an automatic speed change is executed on the basis of a predetermined speed change characteristic and a manual speed change mode in which a manual speed change is executed on the basis of a shifting operation performed by a driver of a vehicle. The speed change control apparatus includes a shifting operation unit, a deceleration detector, and circuitry. The shifting operation unit is configured to receive the shifting operation performed by the driver while the manual speed change mode is being selected. The deceleration detector is configured to detect a deceleration rate of the vehicle. The circuitry is configured to: change a speed ratio of the automatic transmission on the basis of the shifting operation received by the shifting operation unit; acquire a gradient of a road surface of a road on which the vehicle is traveling; set high-speed downshift allowable revolution number on the basis of the deceleration rate of the vehicle and the gradient of the road surface in a case where the shifting operation unit receives the shifting operation that requests downshifting during deceleration of the vehicle; and execute the downshifting in a case where: the shifting operation unit receives the shifting operation that requests the downshifting during the deceleration of the vehicle; and engine revolution number becomes equal to or smaller than the high-speed downshift allowable revolution number. The high-speed downshift allowable number is the engine revolution number at which the downshifting is allowed to be executed during the deceleration of the vehicle.

An aspect of the technology provides a speed change control apparatus for an automatic transmission configured to selectively switch between a plurality of speed change modes including an automatic speed change mode in which an automatic speed change is executed on the basis of a predetermined speed change characteristic and a manual speed change mode in which a manual speed change is executed on the basis of a shifting operation performed by a driver of a vehicle. The speed change control apparatus includes a shifting operation unit, a deceleration detector, and circuitry. The shifting operation unit is configured to receive the shifting operation performed by the driver while the manual speed change mode is being selected. The deceleration detector is configured to detect a deceleration rate of the vehicle. The circuitry is configured to: change a speed ratio of the automatic transmission on the basis of the shifting operation received by the shifting operation unit; set high-speed downshift allowable revolution number on the basis of the deceleration rate of the vehicle in a case where the shifting operation unit receives the shifting operation that requests downshifting during deceleration of the vehicle; determine, on the basis of a driving state of the vehicle, whether the vehicle is making a transition from a deceleration state to an acceleration state; execute the downshifting in a case where: the shifting operation unit receives the shifting operation that requests the downshifting during the deceleration of the vehicle; and engine revolution number becomes equal to or smaller than the high-speed downshift allowable revolution number, and cancel the downshifting being executed in a case where it is determined that the transition from the deceleration state to the acceleration state is made during execution of the downshifting. The high-speed downshift allowable number is the engine revolution number at which the downshifting is allowed to be executed during the deceleration of the vehicle.

BRIEF DESCRIPTION OF THE DRAWINGS

The accompanying drawings are included to provide a further understanding of the technology and are incorporated in and constitute a part of this specification. The drawings illustrate exemplary embodiments and, together with the specification, serve to explain the principles of the technology.

DETAILED DESCRIPTION

The speed change control apparatus described in JP-A No. 2006-258125 suppresses a significant decrease in the engine revolution number below the downshift allowable revolution number after the execution of the downshifting. However, the speed change control apparatus disclosed in JP-A No. 2006-258125 fails to take into consideration of traveling conditions or traveling states, such as road gradients, and possible cases of reacceleration during the downshifting, for example. Thus, an over-revolution of the engine can be caused when the vehicle is traveling on a downward slope or reaccelerated, for example. The setting of the downshift allowable revolution number taking into consideration of all of these conditions to suppress the over-revolution of the engine requires estimation of a larger margin (safety factor), which hinders the downshift allowable revolution number from increasing.

It is desirable to provide a speed change control apparatus for an automatic transmission that certainly suppresses an over-revolution of the engine while achieving downshifting at a high engine speed during deceleration of the vehicle.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
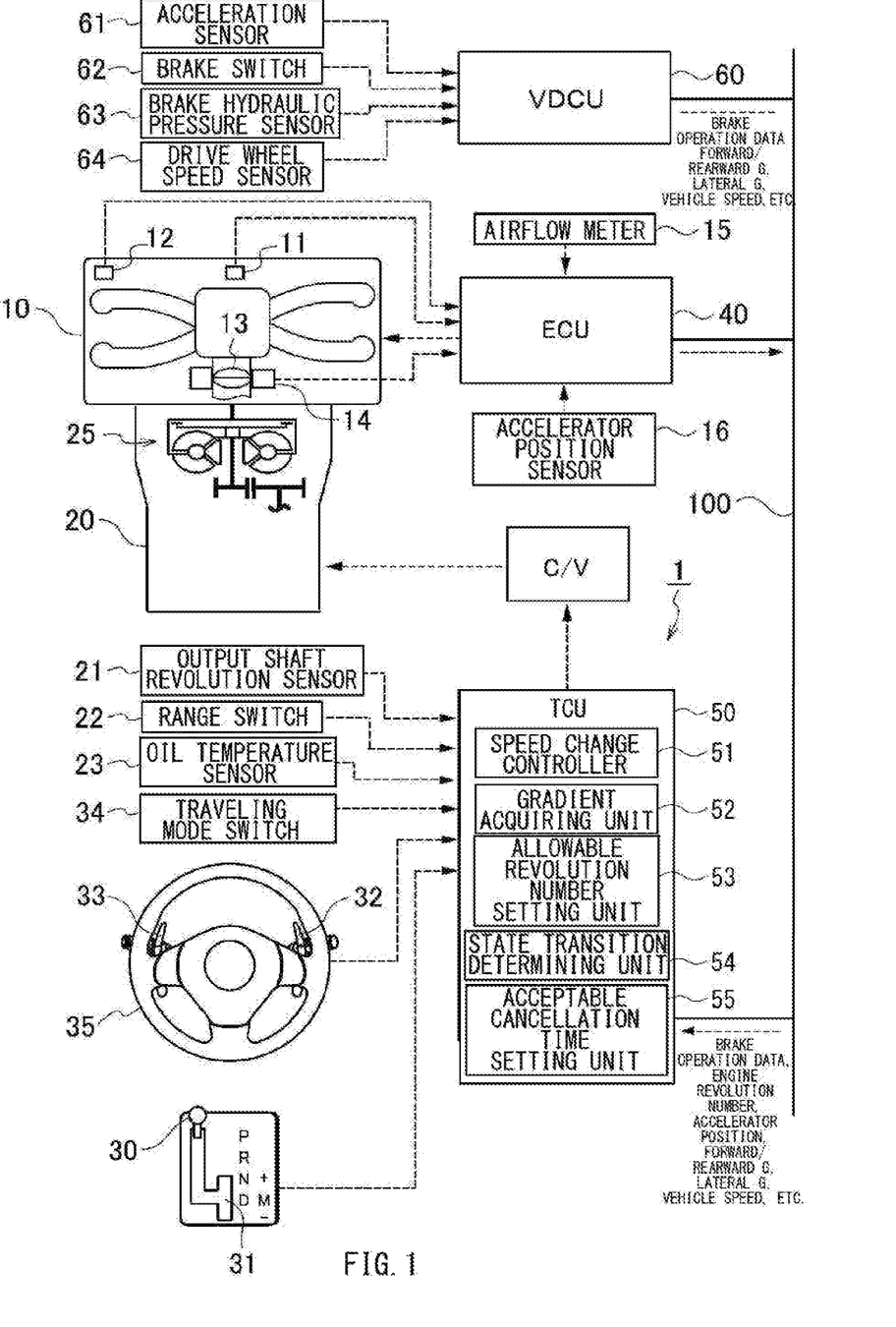
FIG. 1 is a block diagram illustrating an example configuration of a power unit that includes an automatic transmission to which a speed change control apparatus according to one example embodiment of the technology is applied.

First, an example configuration of a speed change control apparatus 1 for an automatic transmission 20 according to an example embodiment of the technology will now be described with reference to FIG. 1. FIG. 1 is a block diagram illustrating an example configuration of a power unit that includes the automatic transmission 20 to which the speed change control apparatus 1 is applied.

An engine 10 may be, for example but not limited to, a flat-four gasoline engine of a cylinder injection type. The air taken into the engine 10 via a non-illustrated air cleaner may be throttled by an electrically-controlled throttle valve (hereinafter simply referred to as a throttle valve) 13 provided in an inlet pipe, and taken into each of the cylinders of the engine 10 via an intake manifold. The rate of air taken into the engine 10 via the air cleaner may be detected by an airflow meter 15. The throttle valve 13 may be provided with a throttle position sensor 14 that detects the position of the throttle valve 13. Each of the cylinders may be provided with an injector that injects fuel, an ignition plug that ignites an air-fuel mixture, and a coil with a built-in ignitor that applies a high voltage to the ignition plug. The mixture of the air taken into each of the cylinders and the fuel injected by the injector may be ignited by the ignition plug to burn, and the burned gas may be exhausted through an exhaust pipe.

In addition to the airflow meter 15 and the throttle position sensor 14 described above, a cam angle sensor 12 may be attached to the vicinity of a cam shaft of the engine 10. The cam angle sensor 12 may be used for cylinder discrimination in the engine 10. Additionally, a crank angle sensor 11 may be attached to the vicinity of a crank shaft of the engine 10. The crank angle sensor 11 may detect the position of the crank shaft. The crank angle sensor 11 may be of an electromagnetic pickup type, for example. These sensors may be coupled to an engine control unit (ECU) 40 described below. An accelerator position sensor 16 that detects the depression amount of the accelerator pedal or the position of the accelerator pedal, a water temperature sensor that detects a cooling water of the engine 10, and other various sensors may also be coupled to the ECU 40.

The engine 10 may have an output shaft coupled to the automatic transmission 20 that converts a driving force received from the engine 10 and outputs the converted driving force. The automatic transmission 20 may include a torque converter 25 that enables a clutch operation and a torque amplifying operation, and a transmission unit that includes gearshift rows and a hydraulic pressure mechanism. The automatic transmission 20 may be a stepped automatic transmission that enables an automatic speed change using the hydraulic pressure mechanism. Alternatively, the automatic transmission 20 may be a continuously variable transmission (CVT) or a dual clutch transmission (DCT), for example. The driving force outputted from the engine 10 may be converted by the automatic transmission 20. The converted driving force may be delivered to a drive wheel of the vehicle via non-illustrated components including an output shaft of the automatic transmission 20, a differential gear, and a drive shaft.

An output shaft revolution sensor 21 may be attached to the vicinity of the output shaft of the automatic transmission 20. The output shaft revolution sensor 21 may detect the number of revolutions of the output shaft. Additionally, a range switch 22 may be coupled to the automatic transmission 20. The range switch 22 may operate in conjunction with a shift lever (select lever) 30 and detect a selected position of the shift lever 30. The output shaft revolution sensor 21, the range switch 22, and other components may be coupled to a transmission control unit (TCU) 50 described below.

An oil temperature sensor 23 may be attached to the automatic transmission 20. The oil temperature sensor 23 may detect the temperature of the automatic transmission fluid (ATF) of the automatic transmission 20 (hereinafter simply referred to as an oil temperature To). The oil temperature sensor 23 may be a thermistor, for example. In one embodiment, the oil temperature sensor 23 may serve as an "oil temperature detector". The oil temperature sensor 23 may also be coupled to the TCU 50.

The shift lever (select lever) 30 may be provided on the floor or a center console of the vehicle, for example. The shift lever 30 may receive driver's switching operations to selectively switch the speed change mode between an automatic speed change mode (D range) and a manual speed change mode (M range). With the shift lever 30, selective switching may be made among the D range, the M range, a parking range (P range), a reverse range (R range), and a neutral range (N range).

An M range switch 31 may be incorporated in the shift lever 30. The M range switch 31 may be turned on when the shift lever 30 positions in the M range, i.e., when the manual speed change mode is selected. The M range switch 31 may be turned off when the shift lever 30 positions in the D range, i.e., when the automatic speed change mode is selected. The M range switch 31 may also be coupled to the TCU 50.

A plus (+) paddle switch 32 and a minus (−) paddle switch 33 may be provided on the rear side of the steering wheel 35. In the manual speed change mode, the plus paddle switch 32 and the minus paddle switch 33 may receive a shifting operation or a request for a speed change from the driver. The plus paddle switch 32 and the minus paddle switch 33 may be hereinafter collectively referred to as paddle switches 32 and 33 as appropriate. The plus paddle switch 32 may be used to perform manual upshifting, and the minus paddle switch 33 may be used to perform manual downshifting. In one embodiment, the plus paddle switch 32 and the minus paddle switch 33 may each serve as a "shifting operation unit". Instead of the paddle switches 32 and 33, the shift lever 30 may have a sequential shift mechanism in which the shift lever 30 is operated upward or downward around the middle position or the M range to perform shifting operations. The paddle switches 32 and 33 may be coupled to the TCU 50 that reads the switching signals outputted from the paddle switches 32 and 33.

The automatic transmission 20 may be operatable in three speed change modes including an automatic speed change mode, a manual speed change mode (hereinafter also referred to as a manual mode), and a temporary manual mode. These speed change modes may be selectively switched by operating the shift lever 30 or the paddle switches 32 and 33.

For example, the automatic speed change mode may be selected by shifting the shift lever 30 to the D range. In the automatic speed change mode, the speed change may be automatically controlled on the basis of a predetermined speed change characteristic. The manual speed change mode may be selected by shifting the shift lever 30 to the M range. In the manual speed change mode, the speed change may be performed in accordance with the driver's shifting operation (the operation of the paddle switches 32 and 33). The temporary manual mode may be selected by the driver's shifting operation (the operation of the paddle switches 32 and 33) performed while the automatic speed change mode (or the D range) is selected. The temporary manual mode may be temporarily held until a predetermined cancellation condition is satisfied.

The output characteristic of the engine 10 and the speed change characteristic of the automatic transmission 20 of the vehicle may be switched by driver's operations. For example, the center console of the vehicle may be provided with a traveling mode switch 34 with which switching may be made among an I mode, an S mode, and an S #mode. The I mode may be used for traveling on a normal road. In the I mode, the output torque may be restricted to achieve easy driving with low fuel consumption. The S mode may be suitable for normal traveling. In the S mode, the output torque may be set to vary substantially linearly relative to the accelerator position. The S #mode may be a power-focused mode with a highly responsive output characteristic from a low rotation range to a high rotation range.

In the I mode focusing on fuel consumption and silence, the speed change control may be executed so that the number of revolutions of the engine 10 (hereinafter also referred to as the engine revolution number) becomes smaller than those in the S mode and the S #mode. In the S mode, the speed change control may be executed so that the engine revolution number becomes larger than that in the I mode (i.e., shifting to a lower side is performed). In the S #mode, the speed change control may be executed so that the engine revolution number becomes larger than that in the S mode (i.e., shifting to further lower side is performed). In one embodiment, the S #mode may serve as a "sport traveling mode". In one embodiment, the traveling mode switch 34 may serve as "sport traveling mode receiver". The traveling mode switch 34 may receive an operation of selecting the sport traveling mode in which the speed change control suitable for sport traveling is executed.

The speed change control of the automatic transmission 20 may be executed by the TCU 50. For example, the output shaft revolution sensor 21, the range switch 22, the oil temperature sensor 23, the M range switch 31, the paddle switches 32 and 33, and the traveling mode switch 34 may be coupled to the TCU 50.

The TCU 50 may be coupled to, for example, the ECU 40 that comprehensively controls the engine 10, and a vehicle dynamics control unit (VDCU) 60, via a controller area network (CAN) 100 to mutually communicating with the ECU 40 and the VDCU 60.

For example, the ECU 40 may include a microprocessor performing calculations, an electrically erasable programmable read-only memory (EEPROM) that stores programs to cause the microprocessor to perform various processes, a random access memory (RAM) that stores various data items including the results of calculations, a backup RAM in which data items are stored by a battery, for example, and an input/output interface (I/F). Various sensors, such as the crank angle sensor 11, the cam angle sensor 12, the throttle position sensor 14, the airflow meter 15, and the accelerator position sensor 16, may be coupled to the ECU 40.

The ECU 40 may perform cylinder discrimination on the basis of an output from the cam angle sensor 12. The ECU 40 may also calculate the engine revolution number from the change in rotational position of the crank shaft detected on the basis of an output from the crank angle sensor 11. On the basis of the detection signal outputted from the various sensors, the ECU 40 may acquire various data items, such as an intake air amount, an accelerator position, the air-fuel ratio of an air-fuel mixture, and a water temperature. On the basis of the acquired data, the ECU 40 may control the fuel injection rate, the ignition timing, and various devices including the throttle valve 13 to comprehensively control the engine 10. The ECU 40 may stop the ignition and fuel supply to the engine when a predetermined condition is satisfied, e.g., when the number of revolutions of the engine 10 exceeds an upper limit revolution number (revolution limit).

The ECU 40 may transmit various data items including the engine water temperature (the temperature of cooling water), the engine bearing torque, the engine revolution number, and the accelerator position, to the TCU 50 via the CAN 100, for example. When receiving a request to reduce the engine output (hereinafter referred to as an engine output reduction request) from the TCU 500 via the CAN 100, the ECU 40 may retard the ignition timing or close the throttle valve 13 to reduce the intake air amount, that is, to reduce the engine output or the engine torque.

A brake switch 62 and a brake hydraulic pressure sensor 63 may be coupled to the VDCU 60. The brake switch 62 may detect whether the brake pedal is depressed. In one embodiment, the brake switch 62 may serve as a "brake operation detector". The brake hydraulic pressure sensor 63 may detect the master cylinder pressure (brake hydraulic pressure) of a brake actuator. In one embodiment, the brake hydraulic pressure sensor 63 may serve as a "brake operation detector". Additionally, various sensors including an acceleration sensor 61, a drive wheel speed sensor 64, and a steering angle sensor may be coupled to the VDCU 60. The acceleration sensor 61 detects the acceleration rate of the vehicle. In one embodiment, the acceleration sensor 61 may serve as a "deceleration detector". The drive wheel speed sensor may detect the rotation speed of each drive wheel of the vehicle (i.e., the vehicle speed). The drive wheel speed sensor 64 may detect the rotations of a gear wheel attached to the center of the drive wheel through magnetic pickup, for example. The steering angle sensor may detect the wheel angle of a front wheel steered by the steering wheel 35 (i.e., the steering angle of the steering wheel 35) by detecting the rotation angle of a pinion shaft.

The VDCU 60 may drive a brake actuator on the basis of the operation amount (depression amount) of the brake pedal to apply a brake to the vehicle. The VDCU 60 may also detect the behaviors of the vehicle using various sensors, such as the acceleration sensor 61, the brake switch 62, the brake hydraulic pressure sensor 63, the drive wheel speed sensor 64, the steering angle sensor, and a yaw rate sensor, to conduct automatic pressure brake control and torque control of the engine 10, suppressing skidding of the vehicle and ensuring the safety of the vehicle turning.

The VDCU 60 may transmit brake operation data including a detected state of the brake switch 62 and a detected brake hydraulic pressure, a drive wheel speed (a vehicle speed), and other data items to the TCU 50 and the ECU 40 through the CAN 100.

The TCU 50 may receive the accelerator position, the number of revolutions of the engine 10, and other data items from the ECU 40 via the CAN 100. Additionally, the TCU 50 may receive the brake operation data on the state of the brake switch 62 and the brake hydraulic pressure, the drive wheel speed (the vehicle speed), and other data items from the VDCU 60 via the CAN 100. The TCU 50 may perform speed change control of the automatic transmission 20 on the basis of various kinds of data items, such as the acquired engine revolution number, the accelerator position, the brake operation data on the brake switch 62 and the brake hydraulic pressure, the drive wheel speed (the vehicle speed), the number of revolutions of the output shaft (the vehicle speed), the shift position of the shift lever 30 (the state of the range switch 22), the state of the M range switch 31, and operation signals of the paddle switches 32 and 33 and the traveling mode switch 34.

For example, the TCU 50 may enable downshifting at a higher engine revolution speed and with higher responsivity during the deceleration (i.e., downshifting in conformance to the driver's intention as much as possible) and more certainly suppress the over-revolution of the engine 10.

For this purpose, the TCU 50 may include a speed change controller 51, a gradient acquiring unit 52, an allowable revolution number setting unit 53, a state transition determining unit 54, and an acceptable cancellation time setting unit 55. The TCU 50 may include a microprocessor performing calculations, an EEPROM that stores programs to cause the microprocessor to perform various processes, an RAM that stores various data items including the results of calculations, a backup RAM in which data items are stored by a battery, for example, and an input/output I/F, for example. In the TCU 50, the programs stored in the EEPROM may be processed by the microprocessor to cause the speed change controller 51, the gradient acquiring unit 52, the allowable revolution number setting unit 53, the state transition determining unit 54, and the acceptable cancellation time setting unit 55 to operate.

The speed change controller 51 changes the speed ratio (transmission step) of the automatic transmission 20. For example, the speed change controller 51 may change the speed ratio (transmission step) of the automatic transmission 20 by controlling the hydraulic pressure mechanism of the automatic transmission 20 on the basis of the shift position of the shift lever 30 (the state of the range switch 22), the state of the M range switch 31, and operation signals from the paddle switches 32 and 33 and the traveling mode switch 34, for example. In one embodiment, the speed change controller 51 may serve as a "speed change controller". The speed change controller 51 will be described in detail later.

The gradient acquiring unit 52 acquires the gradient of the surface of a road (hereinafter simply referred to as a road-surface gradient) on which the vehicle is traveling. In one embodiment, the gradient acquiring unit 52 may serve as a "gradient acquiring unit". The road-surface gradient may be calculated by subtracting the derivative value of the vehicle speed from the acceleration rate (acceleration sensor value) of the vehicle, for example.

For instance, the gradient acquiring unit 52 may acquire or estimate the road-surface gradient on the basis of the difference between a corrected acceleration sensor value and the derivative value of the vehicle speed, as represented by the following expression:

Road-Surface Gradient=Corrected Acceleration Sensor Value−Derivative Value of Vehicle Speed  Expression 1 where the corrected acceleration sensor value is represented by the following expression:

Corrected Acceleration Sensor Value=Acceleration Sensor Value+Zero-point learning value  Expression 2.

The vehicle speed may be a value calculated from the number of revolutions of the output shaft of the automatic transmission 20 detected by the output shaft revolution sensor 21 or the average value of speeds of all drive wheels of the vehicle.

The gradient acquiring unit 52 may estimate the road-surface gradient on the basis of the driving force calculated from the output torque of the engine 10, the acceleration rate of the vehicle calculated from the derivative value of the vehicle speed, and a predetermined weight of the vehicle. Additionally, the gradient acquiring unit 52 may acquire the zero-point learning value of the acceleration sensor 61 while the vehicle is traveling at a substantially constant speed on a level road with an estimated road-surface gradient of substantially 0 (zero) or an estimated road-surface gradient smaller than a predetermined gradient value. The gradient acquiring unit 52 may correct the output value of the acceleration sensor 61 using the zero-point learning value (i.e., add the zero-point learning value to the output value of the acceleration sensor 61), as represented by Expression 2.

A slip angle generated while the vehicle is turning can hamper the accurate detection of the acceleration rate by the acceleration sensor 61 and the accurate calculation of the derivative value of the vehicle speed. Thus, the gradient acquiring unit 52 may determine whether the vehicle is turning on the basis of a steering angle sensor value (also referred to as a steering angle) or a lateral acceleration sensor value (also referred to as lateral gravity or lateral G). If determining that the vehicle is turning, the gradient acquiring unit 52 may stop estimating the road-surface gradient. The road-surface gradient can be erroneously estimated if the drive wheel(s) is slipping. Thus, if the difference among the speeds of the four drive wheels is larger than a predetermined value or if a traction control system (TCS) is activated, the gradient acquiring unit 52 may determine that the driving wheel(s) is slipping and stop estimating the road-surface gradient. Likewise, if the acceleration rate of the vehicle calculated from the derivative value of the vehicle speed is larger than the driving force calculated from the output torque of the engine 10 by a predetermined value or more, the gradient acquiring unit 52 may determine that the driver wheel(s) is slipping and stop estimating the road-surface gradient. The road-surface gradient acquired by the gradient acquiring unit 52 may be outputted to the allowable revolution number setting unit 53.

The allowable revolution number setting unit 53 determines high-speed downshift allowable revolution number on the basis of the deceleration rate of the vehicle and the road-surface gradient in a case where a shifting operation that requests downshifting is performed while the vehicle is decelerating with the sport traveling mode being selected and/or while the brake pedal is being depressed. The high-speed downshift allowable revolution number may be the engine revolution number at which the high-speed downshifting is allowed to be executed during the deceleration of the vehicle. In one embodiment, the allowable revolution number setting unit 53 may serve as an "allowable revolution number setting unit". The allowable revolution number setting unit 53 may increase the high-speed downshift allowable revolution number as the deceleration rate of the vehicle becomes higher. Additionally, the allowable revolution number setting unit 53 may increase the high-speed downshift allowable revolution number as the upward gradient of the road surface becomes larger (refer to high-speed downshift allowable revolution number Ne1 to be set when the deceleration rate is low and the upward gradient is small (illustrated in the middle of FIG. 5), and high-speed downshift allowable revolution number Ne2 to be set when the deceleration rate is high and the upward gradient is large (illustrated at the bottom of FIG. 5)). Note that the deceleration rate of the vehicle may be calculated from the detection value of the acceleration sensor 61 and a variation in vehicle speed (i.e., the derivative vale of a vehicle speed), for example.

The method of setting the high-speed downshift allowable revolution number will now be described. For example, the EEPROM of the TCU 50 may store a map (hereinafter referred to as a high-speed downshift allowable revolution number map) defining the relation among the deceleration rate (m/s2) of the vehicle, the road-surface gradient (%), and the high-speed downshift allowable revolution number (rpm). The allowable revolution number setting unit 53 may search the high-speed downshift allowable revolution number map on the basis of the deceleration rate of the vehicle and the road-surface gradient to set appropriate high-speed downshift allowable revolution number.

Figure 2:
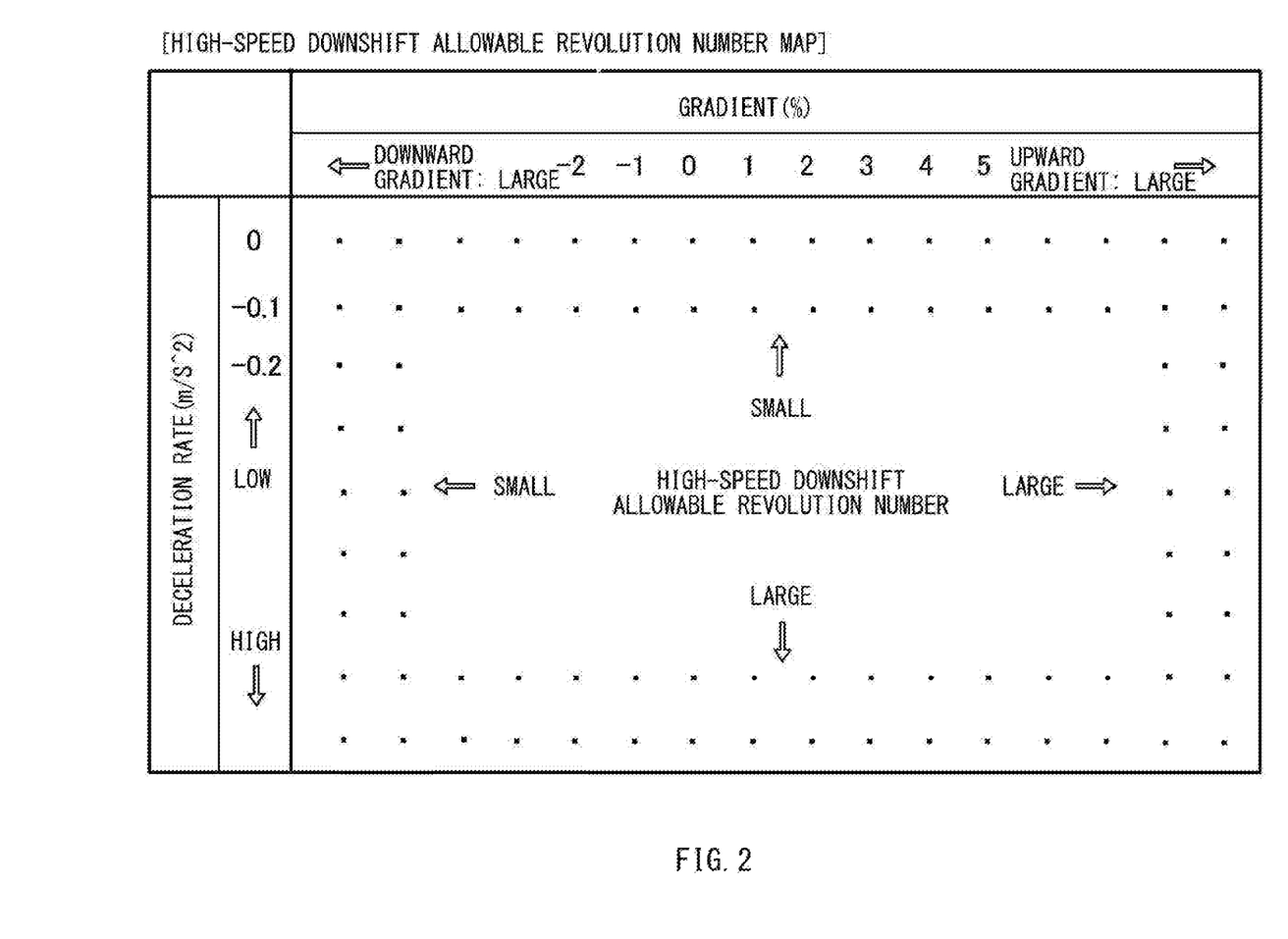
FIG. 2 is a map illustrating the high-speed downshift allowable revolution number to be set during the deceleration according to one example embodiment of the technology.

An example of the high-speed downshift allowable revolution number map is illustrated in FIG. 2. The map illustrated in FIG. 2 has a horizontal axis representing the road-surface gradient (%), and a vertical axis representing the deceleration rate (m/s2). In the high-speed downshift allowable revolution number map, each combination (represented by a dot) of the deceleration rate of the vehicle and the road-surface gradient may be assigned with corresponding high-speed downshift allowable revolution number (rpm). In the map, the high-speed downshift allowable revolution number may increase as the deceleration rate of the vehicle becomes higher. Additionally, the high-speed downshift allowable revolution number may increase as the upward gradient of the road surface becomes larger, that is, as the downward gradient of the road surface is smaller. The allowable revolution number setting unit 53 may set predetermined normal downshift allowable revolution number when the sport traveling mode is not selected, when the brake pedal is not depressed, and/or when the vehicle is not decelerating, for example. The high-speed downshift allowable revolution number set by the allowable revolution number setting unit 53 may be outputted to the speed change controller 51.

In one example, the state transition determining unit 54 may determine that the vehicle is making a transition from a deceleration state to an acceleration state on the basis of the driving state of the vehicle. For example, the state transition determining unit 54 may determine that the vehicle is making the transition from the deceleration state to the acceleration state in a case where the amount of variation in the deceleration rate of the vehicle changes from increasing to decreasing. In one embodiment, the state transition determining unit 54 may serve as a "state transition determining unit". In another example, the state transition determining unit 54 may determine that the vehicle is making the transition from the deceleration state to the acceleration state when the depression of the brake pedal is cancelled (i.e., the brake operation is cancelled), and when the accelerator pedal is depressed (i.e., the acceleration operation is performed), as well as when the amount of variation in the deceleration rate of the vehicle changes from increasing to decreasing. If the state transition determining unit 54 determines that the transition from the deceleration state to the acceleration state is made, the data on the transition of the vehicle from the deceleration state to the acceleration state may be outputted to the acceptable cancellation time setting unit 55 and the speed change controller 51.

The acceptable cancellation time setting unit 55 may set an acceptable cancellation time. The acceptable cancellation time may be a period of time in which the high-speed downshifting is allowed be cancelled. In one embodiment, the acceptable cancellation time setting unit 55 may serve as an "acceptable cancellation time setting unit". A delay time may be generated between the output of a downshift command (control signal) and an actual operation of the clutch caused by the application or releasing of the hydraulic pressure (i.e., the start of the shifting operation). The downshifting may be allowed to be cancelled (i.e., the downshift command may be allowed be cancelled) in the period from the output of the downshift command (control signal) to the elapse of the delay time. The delay time may have a correlation with the oil temperature (i.e., the viscosity of the automatic transmission oil). In other words, the delay time may be influenced by the oil temperature. Thus, the acceptable cancellation time setting unit 55 may set an acceptable cancellation time in which the downshifting is allowed to be cancelled on the basis of the oil temperature.

The acceptable cancellation time setting unit 55 may shorten the acceptable cancellation time as the oil temperature becomes higher. Additionally, the acceptable cancellation time setting unit 55 may set the acceptable cancellation time for each combination of the speed ratio at the start of the downshifting and the speed ratio at the end of the downshifting (i.e., for each downshift pattern).

The method of setting the acceptable cancellation time will now be described. For example, the EEPROM of the TCU 50 may store a table (hereinafter referred to as an acceptable-cancellation-time table) defining the relation between the oil temperature To of the automatic transmission 20 and the acceptable cancellation time (msec) for each combination of the speed ratio at the start of the downshifting and the speed ratio at the end of the downshifting (i.e., for each downshift pattern). The acceptable cancellation time setting unit 55 may search the acceptable-cancellation-time table on the basis of the oil temperature To of the automatic transmission 20 to set an appropriate acceptable cancellation time.

Figure 3:
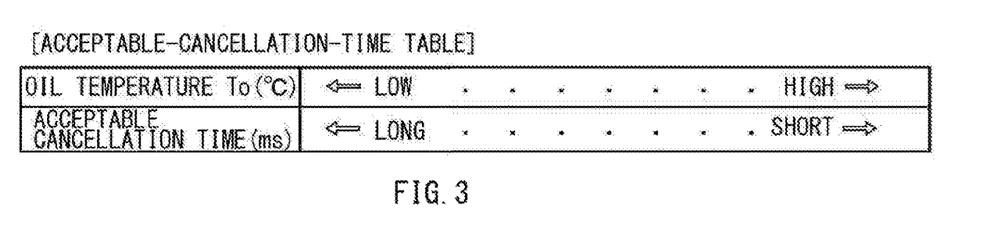
FIG. 3 is a table illustrating an acceptable cancellation time according to one example embodiment of the technology.

An example of the acceptable-cancellation-time table is illustrated in FIG. 3. The timetable illustrated in FIG. 3 has a horizontal axis representing the oil temperature To (° C.) of the automatic transmission 20 and a vertical axis representing the acceptable cancellation time (msec). The acceptable-cancellation-time table may define a shorter acceptable cancellation time as the oil temperature To of the automatic transmission 20 becomes higher. The acceptable cancellation time set by the acceptable cancellation time setting unit 55 may be outputted to the speed change controller 51.

The speed change controller 51 may execute the downshifting (i.e., the high-speed downshifting) in a case where: a shifting operation that requests downshifting is performed while the vehicle is decelerating with the sport traveling mode being selected and/or while the brake pedal is being depressed; and the engine revolution number becomes equal to or smaller than the high-speed downshift allowable revolution number. The speed change controller 51 may execute normal downshifting when the sport traveling mode is not selected, when the brake pedal is not depressed, and/or when the vehicle is not decelerating. In other words, the speed change controller 51 may execute normal downshifting when the engine revolution number becomes equal to or smaller than a normal downshift allowable revolution number.

When the state transition determining unit 54 determines that the transition from the deceleration state to the acceleration state is made in the middle of (or during) the execution of the high-speed downshifting, the speed change controller 51 may halt or cancel the high-speed downshifting being executed.

If the elapsed time from the start of the high-speed downshifting process (i.e., the elapsed time from the output of the downshift command) is equal to or shorter than the acceptable cancellation time, the speed change controller 51 may cancel the high-speed downshift being executed. In contrast, if the elapsed time from the start of the high-speed downshifting process is longer than the acceptable cancellation time and the engine revolution number is larger than predetermined revolution number, the speed change controller 51 may issue the engine output reduction request and/or perform upshifting of the automatic transmission 20.

In one example, the speed change controller 51 may execute the series of the high-speed downshifting control processes described above only when the sport traveling mode is selected. When the sport traveling mode is not selected, the speed change controller 51 may execute normal downshifting control on the basis of predetermined downshift allowable revolution number regardless of the deceleration rate of the vehicle, suppressing the intervention of control that the driver does not intend to execute (i.e., suppressing the execution of the high-speed downshifting control that the driver does not intend to execute).

Likewise, in another example, the speed change controller 51 may execute the series of the high-speed downshifting control processes described above only when the brake pedal is depressed (i.e., when the brake operation is performed). When the brake pedal is not depressed (i.e., when the brake operation is not performed), the speed change controller 51 may execute the normal downshifting control on the basis of predetermined downshift allowable revolution number regardless of the deceleration rate of the vehicle, suppressing the intervention of control that the driver does not intend to execute (i.e., suppressing the execution of the high-speed downshifting control that the driver does not intend to execute) and the over-revolution of the engine 10.

Figure 4:
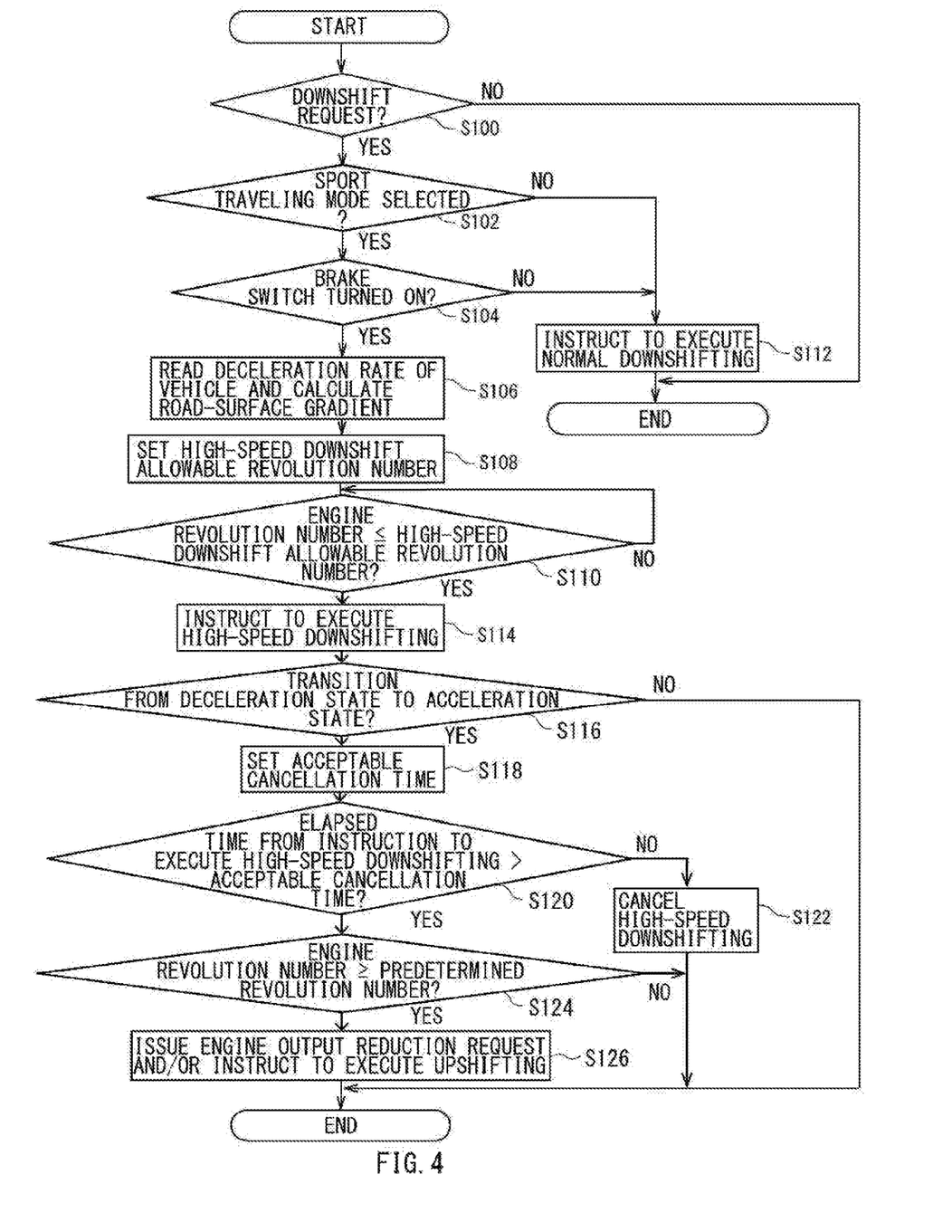
FIG. 4 is a flowchart illustrating a high-speed downshifting process executed by the speed change control apparatus according to one example embodiment during deceleration.

The operation of the speed change control apparatus 1 for the automatic transmission 20 will now be described with reference to FIG. 4. FIG. 4 is a flowchart illustrating an example procedure for the high-speed downshifting process executed by the speed change control apparatus 1. The procedure may be repeated in TCU 50 every predetermined time, for example, every ten milliseconds.

First, in Step S100, it may be determined whether a downshifting operation is performed, i.e., whether a downshift request is made, while the vehicle is decelerating. If the downshifting operation is not performed (Step S100: NO), the procedure may exit the routine. In contrast, if the downshifting operation is performed (Step S100: YES), the procedure may proceed to Step S102.

In Step S102, it may be determined whether the sport traveling mode is selected. If the sport traveling mode is not selected (Step S102: NO), the normal downshifting process may be executed in Step S112 (refer to the normal downshift allowable revolution number Ne0 illustrated at the top of FIG. 5). In contrast, if the sport traveling mode is selected (Step S102: YES), the procedure may proceed to Step S104.

In Step S104, it may be determined whether the brake pedal is depressed (e.g., whether the brake switch 62 is turned on). If the brake pedal is not depressed (Step S104: NO), the normal downshifting process may be executed in Step S112 (refer to the normal downshift allowable revolution number Ne0 illustrated at the top of FIG. 5). In contrast, if the brake pedal is depressed (Step S104: YES), the procedure may proceed to Step S106.

In Step S106, the deceleration rate of the vehicle may be read and the road-surface gradient of the road on which the vehicle is traveling may be calculated. Since the method of calculating the road-surface gradient is described above, the detailed description of the method is not repeated here.

In Step S108, the high-speed downshift allowable revolution number may be set on the basis of the deceleration rate of the vehicle and the road surface gradient. As described above, it may be determined whether the high-speed downshifting is allowed to be executed during the deceleration of the vehicle on the basis of the high-speed downshift allowable revolution number. The high-speed downshift allowable revolution number may be increased as the deceleration rate of the vehicle becomes higher and the upward gradient of the road surface becomes larger (i.e., as the downward gradient of the road surface is smaller). Since the method of setting the high-speed downshift allowable revolution number is described above, the detailed description of the method is not repeated here.

In Step S110, it may be determined whether the engine revolution number is equal to or smaller than the high-speed downshift allowable revolution number. If the engine revolution number is larger than the high-speed downshift allowable revolution number (Step S110: NO), Step S110 may be repeated until the engine revolution number becomes equal to or smaller than the high-speed downshift allowable revolution number. In contrast, if the engine revolution number is equal to or smaller than the high-speed downshift allowable revolution number, the procedure may proceed to Step S114.

Figure 5:
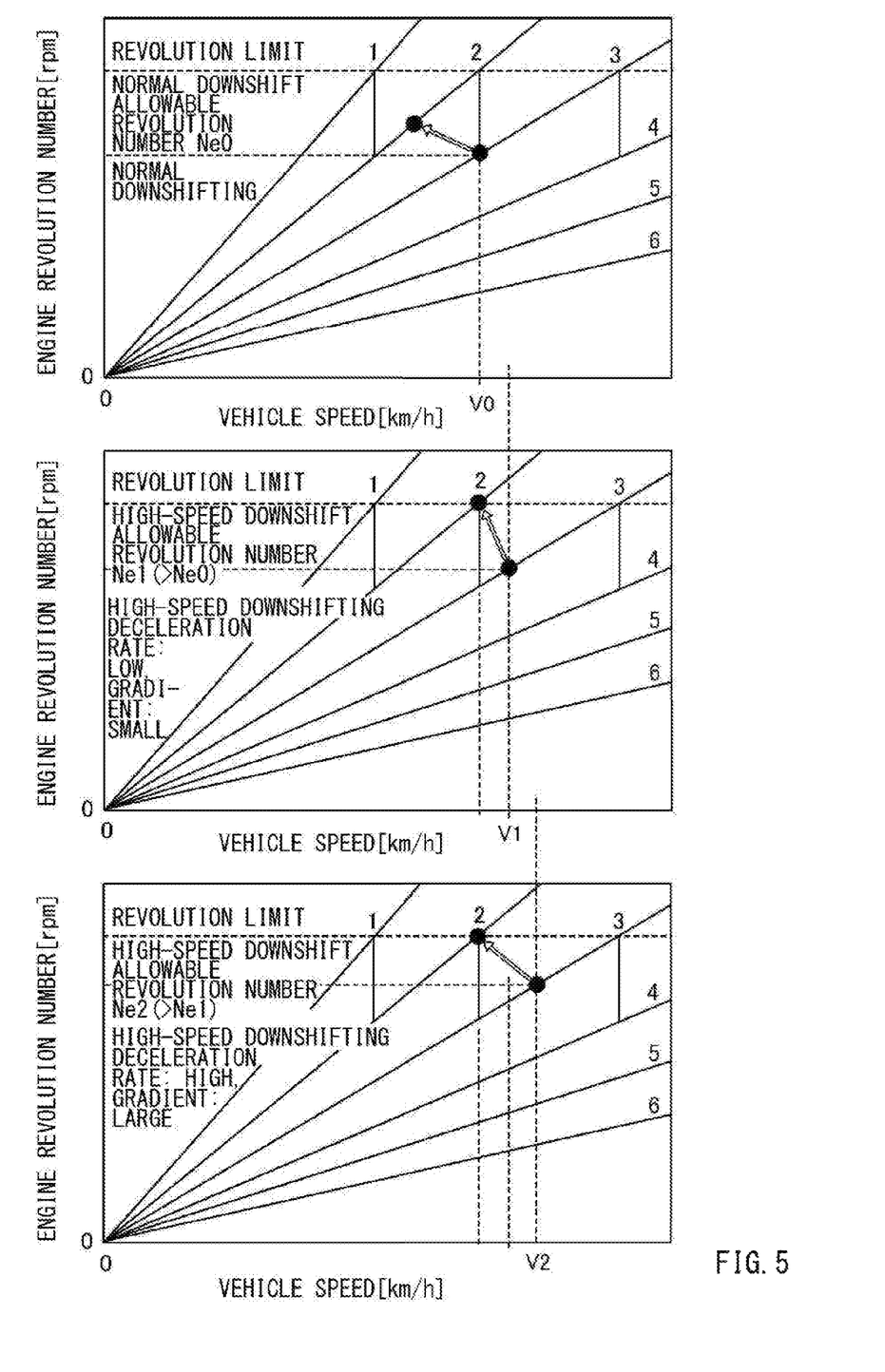
FIG. 5 is a diagram illustrating high-speed downshift allowable revolution numbers, vehicle speeds, speed ratios, and changes in the engine revolution number during downshifting according to one example embodiment of the technology.

In Step S114, the downshift command (control signal) may be outputted to start the high-speed downshifting of the automatic transmission 20 (refer to the high-speed downshift allowable revolution number Ne1 illustrated in the middle of FIG. 5 and the high-speed downshift allowable revolution number Ne2 illustrated at the bottom of FIG. 5).

In Step S116, it may be determined whether the vehicle is making a transition from the deceleration state to the acceleration state. If it is not determined that the transition from the deceleration state to the acceleration state is made (Step S116: NO), the high-speed downshifting may be continuously executed, and thereafter, the procedure may exit the routine. In contrast, if it is determined that the transition from the deceleration state to the acceleration state is made (Step S116: YES), the procedure may proceed to Step S118. Since the method of determining whether the vehicle is making the transition from the deceleration state to the acceleration state is described above, the detailed description of the method is not repeated here.

In Step S118, the acceptable cancellation time may be set on the basis of the oil temperature. As described above, the acceptable cancellation time may be a period of time in which the high-speed downshifting is allowed to be cancelled. Since the method of setting the acceptable cancellation time is described above, the detailed description of the method is not repeated here.

In Step S120, it may be determined whether the elapsed time from the start of the high-speed downshifting process (i.e., from the output of the downshift command or control command) is longer than the acceptable cancellation time. If the elapsed time from the start of the high-speed downshifting process is equal to or shorter than the acceptable cancellation time (Step S120: NO), the high-speed downshifting process may be cancelled in Step S122, and thereafter the procedure may exit the routine. In contrast, if the elapsed time from the start of the high-speed downshifting process is longer than the acceptable cancellation time (Step S120: YES), the procedure may proceed to Step S124.

In Step S124, it may be determined whether the engine revolution number is equal to or larger than predetermined revolution number, i.e., the possibility of the over-revolution of the engine may be examined. If the engine revolution number is smaller than the predetermined revolution number (Step S124: NO), the procedure may exit the routine. In contrast, if the engine revolution number is equal to or larger than the predetermined revolution number (Step S124: YES), the procedure may proceed to Step S126.

In Step S126, the request to reduce the output of the engine 10 (i.e., the engine output reduction request) may be sent to the ECU 40, and/or the upshifting of the automatic transmission 20 may be performed to suppress the over-revolution of the engine 10. Thereafter, the procedure may exit the routine.

In at least one example embodiment described in detail above, the high-speed downshift allowable revolution number is set on the basis of the deceleration rate of the vehicle and the road-surface gradient in a case where the shifting operation that requests downshifting is performed during the deceleration of the vehicle. Whether the downshifting is allowed to be executed is determined on the basis of the high-speed downshift allowable revolution number. If the engine revolution number becomes equal to or smaller than the high-speed downshift allowable revolution number, the high-speed downshifting is allowed to be executed. With such a setting of the high-speed downshift allowable revolution number based on the road-surface gradient as well as the deceleration rate of the vehicle or the decrease in the engine revolution number due to the deceleration caused by the shifting operation, the margin (safety factor) for the setting of the high-speed downshift allowable revolution number is reduced than ever. As a result, it is possible to achieve the downshifting at a higher engine revolution speed and with higher responsivity in conformation to the driver's intention and to more certainly suppress the over-revolution of the engine 10 during the deceleration of the vehicle.

In some example embodiments, the high-speed downshift allowable revolution number may be increased as the deceleration rate of the vehicle becomes higher and as the upward gradient of the road surface becomes larger (i.e., as the downward gradient of the road surface is smaller). As a result, it is possible to achieve the downshifting at a higher engine revolution speed and to more certainly suppress the over-revolution of the engine 10.

With reference to FIG. 5, the normal downshift allowable revolution number Ne0 is illustrated at the top of FIG. 5. The high-speed downshift allowable revolution number Ne1, illustrated in the middle of FIG. 5, may be set when the deceleration rate is low and the upward gradient of the road surface is small. Additionally, the high-speed downshift allowable revolution number Ne2, illustrated at the bottom of FIG. 5, may be set when the deceleration rate is high and the upward gradient of the road surface is large. FIG. 5 has a horizontal axis representing the vehicle speed (km/h) and a vertical axis representing the engine revolution number (rpm). Unlike the normal downshift allowable revolution number Ne0 set without considering the deceleration rate and the road-surface gradient, the high-speed downshift allowable revolution number may be increased as the deceleration rate becomes higher and the upward gradient of the road surface becomes larger (i.e., the high-speed downshift allowable revolution number Ne1<the high-speed downshift allowable revolution number Ne2), as illustrated in FIG. 5. As a result, the start of the downshifting is expedited, and the engine revolution number after the downshifting is maintained at the high revolution number (e.g., substantially at the revolution limit).

In some example embodiments, the downshifting (high-speed downshifting during the deceleration) being executed may be cancelled if it is determined that the transition from the deceleration state to the acceleration state is made during the execution of the downshifting. In other words, the downshifting (high-speed downshifting during the deceleration) being executed may be cancelled if the engine 10 has the possibility of an over-revolution. With such a setting of the high-speed downshift allowable revolution number, the margin (safety factor) may be reduced than ever. As a result, it is possible to achieve the downshifting at a higher engine revolution speed and to more certainly suppress the over-revolution of the engine 10 during the deceleration of the vehicle.

In some example embodiments, it may be determined that the transition from the deceleration state to the acceleration state is made when the amount of variation in the deceleration rate of the vehicle changes from increasing to decreasing, when the brake operation is cancelled, and/or when the acceleration operation is performed. Therefore, it is possible to determine the occurrence of the transition from the deceleration state to the acceleration state with higher accuracy.

In some example embodiments, the acceptable cancellation time in which the downshifting is allowed to be cancelled may be set on the basis of the oil temperature. This enables a more appropriate setting of the acceptable cancellation time and more effective cancellation of the downshifting. In this case, the acceptable cancellation time may be shortened as the oil temperature becomes higher. This enables a still more appropriate setting of the acceptable cancellation time. Furthermore, in some example embodiments, the acceptable cancellation time may be set in consideration of the oil temperature and the combination of the speed ratio at the start of the downshifting and the speed ratio at the end of the downshifting (i.e., the downshift pattern). This enables a still more appropriate setting of the acceptable cancellation time.

In some example embodiments, if there is the possibility of an over-revolution after the elapse of the acceptable cancellation time, the output of the engine 10 may be reduced and/or the upshifting of the automatic transmission 20 may be performed to suppress the over-revolution of the engine. This reduces the margin (safety factor) for the setting of the high-speed downshift allowable revolution number than ever.

In some example embodiments, when the sport traveling mode is not selected, the normal downshifting control may be executed on the basis of predetermined downshift allowable revolution number regardless of the deceleration rate of the vehicle. As a result, it is possible to suppress the intervention of control that the driver does not intend to execute (i.e., suppress the execution of the high-speed downshifting control that the driver does not intend to execute from being executed during the deceleration of the vehicle).

Likewise, in some example embodiments, when the brake operation is not performed, the normal downshifting control may be executed on the basis of the predetermined downshift allowable revolution number regardless of the deceleration rate of the vehicle. As a result, it is possible to suppress the intervention of control that the driver does not intend to execute (i.e., suppress the execution of the high-speed downshifting control that the driver does not intend to execute from being executed during the deceleration of the vehicle) and the over-revolution of the engine.

Note that example embodiments of the technology should not be limited to the example embodiments described above and various modifications may be made in the example embodiments. For example, although the automatic transmission 20 is a step automatic transmission in some example embodiments described above, the automatic transmission 20 may be, for example, a continuously variable transmission (CVT) or a dual clutch transmission (DCT) instead of the step automatic transmission. In the case of a CVT, there may be no need to execute the processes in Steps S118 and S120 of the flowchart described above. Thus, if it is determined as YES in Step S116, the processes in Step S122 and/or Steps S124 and S126 may be executed.

Note that the procedure described above with reference to the flowchart is a mere example. In another example, the processes in Steps S102 and S104 may be omitted. For example, if it is determined as YES in Step S100, the procedure may proceed to Step S106. In still another example, Steps S116 to S126 may be omitted. In still another example, the high-speed downshift allowable revolution number may be determined only on the basis of the deceleration rate of the vehicle in Steps S106 and S108. In such an example, the processes in Steps S116 to S126 may be essential. Note that one or both of the engine output reduction request and the upshifting may be made or performed in Step S126 in consideration of the engine revolution number and the rate of rise of the engine revolution number.

In some example embodiments, the state of the traveling mode switch 34 may be used to determine whether the vehicle is traveling in the sport traveling mode. In another example embodiment, an index value indicating the degree of the sport traveling may be used instead of the state of the traveling mode switch 34. The index value may be calculated from the state of the accelerator pedal operated by the driver (e.g., the amount of operation and the frequency of the operations of the accelerator pedal), and the integrated value of the forward and rearward acceleration rate and the lateral acceleration rate detected by a forward and rearward acceleration sensor and a lateral acceleration sensor, respectively. If the index value indicating the degree of the sport traveling is equal to or larger than a predetermined threshold, it may be determined that the vehicle is traveling in the sport traveling mode. If the index value is smaller than the predetermined threshold, it may not be determined that the vehicle is traveling in the sport traveling mode.

Although the ECU 40 that controls the engine 10 and the TCU 50 that controls the automatic transmission 20 may be different pieces of hardware in some example embodiments described above, the ECU 40 and the TCU 50 may be a single integrated piece of hardware in another example embodiment.

In at least one example embodiment of the technology, the speed change control apparatus for the automatic transmission detects the deceleration rate of the vehicle and acquires the gradient of the surface of the road on which the vehicle is traveling. When the shifting operation that requests downshifting is performed during the deceleration of the vehicle, the speed change control apparatus set the high-speed downshift allowable revolution number on the basis of the deceleration rate of the vehicle and the road-surface gradient. The high-speed downshift allowable revolution number is used to determine whether the downshifting is allowed to be executed. When the engine revolution number becomes equal to or smaller than the high-speed downshift allowable revolution number, the downshifting (high-speed downshifting during the deceleration) is allowed to be executed. With such a setting of the high-speed downshift allowable revolution number based on the road-surface gradient as well as the deceleration rate of the vehicle or the decrease in the engine revolution number due to the deceleration caused by the shifting operation, the margin (safety factor) is reduced than ever. As a result, it is possible to achieve the downshifting at a higher engine revolution speed and to more certainly suppress the over-revolution of the engine during the deceleration of the vehicle.

In some example embodiments of the technology, the high-speed downshift allowable revolution number may be increased as the deceleration rate of the vehicle becomes higher and as the upward gradient of the road surface becomes larger. In general, the decrease in the engine revolution number due to the deceleration caused by the shifting operation can be larger when the vehicle is traveling on an uphill road than when the vehicle is traveling on a flat or downhill road, provided that the engine output, the braking force, and other conditions are the same between these cases. Additionally, even if the vehicle is accelerated after the engine revolution number is increased by the downshifting, the acceleration can be suppressed by the weight of the vehicle. In this case, the over-revolution of the engine is thus unlikely to occur. In contrast, the decrease in the engine revolution number due to the deceleration caused by the shifting operation can be smaller when the vehicle is traveling on a downhill road than when the vehicle is traveling on a flat or uphill road. Additionally, if the vehicle is accelerated after the engine revolution number is increased by the downshifting, the acceleration can be facilitated by the weight of the vehicle. In this case, the over-revolution of the engine is thus likely to occur. Accordingly, in some example embodiment taking into consideration of these circumstances, the high-speed downshift allowable revolution number may be increased as the deceleration rate of the vehicle becomes higher and as the upward gradient of the road surface becomes larger. It is therefore possible to achieve the downshifting at a higher engine revolution speed and to more certainly suppress the over-revolution of the engine 10 during the deceleration of the vehicle.

In at least one example embodiment of the technology, the speed change control apparatus for the automatic transmission sets the high-speed downshift allowable revolution number on the basis of the deceleration rate when the shifting operation that requests downshifting is performed during the deceleration of the vehicle. The high-speed downshift allowable revolution number is used to determine whether the downshifting is allowed to be executed. The downshifting (high-speed downshifting during the deceleration) is allowed to be executed when the engine revolution number becomes equal to or smaller than the high-speed downshift allowable revolution number. The downshifting (the high-speed downshifting during the deceleration) being executed is cancelled if it is determined that the transition from the deceleration state to the acceleration state is made during the execution of the downshifting (the high-speed downshifting during the deceleration). In other words, the downshifting (high-speed downshifting during the deceleration) being executed may be cancelled if the engine has the possibility of an over-revolution. With such a setting of the high-speed downshift allowable revolution number, the margin (safety factor) is reduced than ever. As a result, it is possible to achieve the downshifting at a higher engine revolution speed and to more certainly suppress the over-revolution of the engine during the deceleration of the vehicle.

In some example embodiments of the technology, it may be determined that the vehicle is making the transition from the deceleration state to the acceleration state when the amount of variation in the deceleration rate of the vehicle changes from increasing to decreasing, when the brake operation is cancelled, and/or when the acceleration operation is performed. Therefore, it is possible to determine the occurrence of the transition from the deceleration state to the acceleration state with higher accuracy.

In some example embodiments of the technology, the acceptable cancellation time in which the downshifting is allowed to be cancelled may be set on the basis of the oil temperature. The downshifting being executed may be cancelled in a case where: it is determined that the transition from the deceleration state to the acceleration state is made during the downshifting; and the elapsed time from the start of the downshifting process is equal to or shorter than the acceptable cancellation time. A delay time may be generated between the output of a downshift command (control signal) and an actual operation of the clutch caused by the application or releasing of the hydraulic pressure (i.e., the start of the shifting operation). The downshifting is allowed to be cancelled (i.e., the downshift command may be cancelled) in the period from the output of the downshift command (control signal) to the elapse of the delay time. The delay time may have a correlation with the oil temperature (i.e., the viscosity of the automatic transmission oil). In other words, the delay time may be influenced by the oil temperature. Thus, the acceptable cancellation time in which the downshifting is allowed to be cancelled may be set on the basis of the oil temperature. This enables a more appropriate setting of the acceptable cancellation time and more effective cancellation of the downshifting.

In some example embodiments of the technology, the acceptable cancellation time may be shortened as the oil temperature becomes higher. The viscosity of the automatic transmission oil may decrease as the oil temperature becomes higher, and the delay time may be reduced accordingly. Thus, the setting in which the acceptable cancellation time is shortened as the oil temperature becomes higher leads to a more appropriate setting of the acceptable cancellation time.

In some example embodiments of the technology, the acceptable cancellation time may be set on the basis of the oil temperature and the combination of the speed ratio at the start of the downshifting and the speed ratio at the end of the downshifting. The delay time described above may vary depending on the combination of the speed ratio at the start of the downshifting and the speed ratio at the end of the downshifting (i.e., the downshift pattern). Thus, such a setting of the acceptable cancellation time in consideration of the oil temperature and the combination of the speed ratio at the start of the downshifting and the speed ratio at the end of the downshifting leads to a still more appropriate setting of the acceptable cancellation time.

In some example embodiments of the technology, the engine output reduction request may be issued and/or the upshifting of the automatic transmission may be performed in a case where: the transition from the deceleration state to the acceleration state is determined during the execution of the downshifting; the acceptable cancellation time has elapsed since the start of the downshifting process; and the engine revolution number is equal to or larger than predetermined revolution number. When the delay time (or the acceptable cancellation time) has elapsed since the output of the downshift command (output command), the clutch may begin to actually operate (i.e., the shifting operation may start), hindering the cancellation of the downshifting (i.e., the cancellation of the downshift command). Thus, if there is the possibility of an over-revolution after the elapse of the acceptable cancellation time, the output of the engine may be reduced and/or the upshifting of the automatic transmission may be performed to suppress the over-revolution of the engine. Therefore, it is possible to issue the engine output reduction request and to conduct the upshifting of the automatic transmission if there is the possibility of an over-revolution of the engine. This reduces the margin (safety factor) for the setting of the high-speed downshift allowable revolution number than ever.

In some example embodiments of the technology, the normal downshifting control may be executed on the basis of predetermined downshift allowable revolution number regardless of the deceleration rate of the vehicle when the sport traveling mode is not selected. In other words, the high-speed downshifting may be executed only when the sport traveling mode is selected. Thus, it is possible to suppress the intervention of control that the driver does not intend to execute (i.e., suppress the execution of the high-speed downshifting control that the driver does not intend to execute).

In some example embodiments of the technology, the normal downshifting control may be executed on the basis of predetermined downshift allowable revolution number regardless of the deceleration rate of the vehicle when the brake pedal is not operated. In other words, the high-speed downshifting may be executed only when the brake pedal is operated. Thus, it is possible to suppress the intervention of control that the driver does not intend to execute (i.e., suppress the execution of the high-speed downshifting control that the driver does not intend to execute) and the over-revolution of the engine.

According to any example embodiment of the technology, it is possible to achieve the downshifting at a higher engine revolution speed and to more certainly suppress the over-revolution of the engine.

One or more of the speed change controller 51, the gradient acquiring unit 52, the allowable revolution number setting unit 53, and the state transition determining unit 54 in the speed change control apparatus 1 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the speed change controller 51, the gradient acquiring unit 52, the allowable revolution number setting unit 53, and the state transition determining unit 54. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the speed change controller 51, the gradient acquiring unit 52, the allowable revolution number setting unit 53, and the state transition determining unit 54 in the speed change control apparatus 1 illustrated in FIG. 1.

The invention claimed is:

1. A speed change control apparatus for an automatic transmission configured to selectively switch between a plurality of speed change modes including an automatic speed change mode in which an automatic speed change is executed on a basis of a predetermined speed change characteristic and a manual speed change mode in which a manual speed change is executed on a basis of a shifting operation performed by a driver of a vehicle, the speed change control apparatus comprising:
   a shifting operation unit configured to receive the shifting operation performed by the driver while the manual speed change mode is being selected;
   a speed change controller configured to change a speed ratio of the automatic transmission on a basis of the shifting operation received by the shifting operation unit;
   a deceleration detector configured to detect a deceleration rate of the vehicle;
   a gradient acquiring unit configured to acquire a gradient of a road surface of a road on which the vehicle is traveling; and
   an allowable revolution number setting unit configured to set high-speed downshift allowable revolution number on a basis of the deceleration rate of the vehicle and the gradient of the road surface in a case where the shifting operation unit receives the shifting operation that requests downshifting during deceleration of the vehicle, the high-speed downshift allowable revolution number comprising engine revolution number at which the downshifting is allowed to be executed during the deceleration of the vehicle, wherein
   the speed change controller is configured to execute the downshifting in a case where: the shifting operation unit receives the shifting operation that requests the downshifting during the deceleration of the vehicle; and the engine revolution number becomes equal to or smaller than the high-speed downshift allowable revolution number.

2. The speed change control apparatus according to claim 1, wherein
   the allowable revolution number setting unit is configured to
   increase the high-speed downshift allowable revolution number as the deceleration rate of the vehicle becomes higher, and
   increase the high-speed downshift allowable revolution number as an upward gradient of the road surface becomes larger.

3. The speed change control apparatus according to claim 2, further comprising
   a sport traveling mode receiver configured to receive an operation of selecting a sport traveling mode in which speed change control suitable for sport traveling is executed, wherein,
   the speed change controller is configured to execute, when the sport traveling mode is not selected, normal downshifting control on a basis of predetermined downshift allowable revolution number regardless of the deceleration rate of the vehicle.

4. The speed change control apparatus according to claim 2, further comprising
   a brake operation detector configured to detect a brake operation that applies a brake to the vehicle, wherein,
   the speed change controller is configured to execute, when the brake operation is not detected, normal downshifting control on a basis of predetermined downshift allowable revolution number regardless of the deceleration rate of the vehicle.

5. The speed change control apparatus according to claim 1, further comprising
   a sport traveling mode receiver configured to receive an operation of selecting a sport traveling mode in which speed change control suitable for sport traveling is executed, wherein,
   the speed change controller is configured to execute, when the sport traveling mode is not selected, normal downshifting control on a basis of predetermined downshift allowable revolution number regardless of the deceleration rate of the vehicle.

6. The speed change control apparatus according to claim 1, further comprising
   a brake operation detector configured to detect a brake operation that applies a brake to the vehicle, wherein,
   the speed change controller is configured to execute, when the brake operation is not detected, normal downshifting control on a basis of predetermined downshift allowable revolution number regardless of the deceleration rate of the vehicle.

7. A speed change control apparatus for an automatic transmission configured to selectively switch between a plurality of speed change modes including an automatic speed change mode in which an automatic speed change is executed on a basis of a predetermined speed change characteristic and a manual speed change mode in which a manual speed change is executed on a basis of a shifting operation performed by a driver of a vehicle, the speed change control apparatus comprising:
   a shifting operation unit configured to receive the shifting operation performed by the driver while the manual speed change mode is being selected;
   a speed change controller configured to change a speed ratio of the automatic transmission on a basis of the shifting operation received by the shifting operation unit;
   a deceleration detector configured to detect a deceleration rate of the vehicle;
   an allowable revolution number setting unit configured to set high-speed downshift allowable revolution number on a basis of the deceleration rate of the vehicle in a case where the shifting operation unit receives the shifting operation that requests downshifting during deceleration of the vehicle, the high-speed downshift allowable revolution number comprising engine revolution number at which the downshifting is allowed to be executed during the deceleration of the vehicle; and
   a state transition determining unit configured to determine, on a basis of a driving state of the vehicle, whether the vehicle is making a transition from a deceleration state to an acceleration state, wherein
   the speed change controller is configured to execute the downshifting in a case where: the shifting operation unit receives the shifting operation that requests the downshifting during the deceleration of the vehicle; and the engine revolution number becomes equal to or smaller than the high-speed downshift allowable revolution number, and cancel the downshifting being executed in a case where the state transition determining unit determines that the transition from the deceleration state to the acceleration state is made during execution of the downshifting.

8. The speed change control apparatus according to claim 7, wherein the state transition determining unit is configured to determine that the transition from the deceleration state to the acceleration state is made, in one or more of cases where: an amount of variation in the deceleration rate of the vehicle changes from increasing to decreasing; a brake operation is cancelled; and an acceleration operation is performed.

9. The speed change control apparatus according to claim 8, further comprising:

an oil temperature detector configured to detect an oil temperature of the automatic transmission; and an acceptable cancellation time setting unit configured to set, on a basis of the oil temperature, an acceptable cancellation time in which the downshifting is allowed to be cancelled, wherein the speed change controller is configured to cancel the downshifting being executed in a case where: the state transition determining unit determines that the transition from the deceleration state to the acceleration state is made during the execution of the downshifting; and an elapsed time from a start of a process of the downshifting is equal to or shorter than the acceptable cancellation time.

10. The speed change control apparatus according to claim 9, wherein the acceptable cancellation time setting unit is configured to shorten the acceptable cancellation time as the oil temperature becomes higher.

11. The speed change control apparatus according to claim 8, further comprising a gradient acquiring unit configured to acquire a gradient of a road surface of a road on which the vehicle is traveling, wherein the allowable revolution number setting unit is configured to set the high-speed downshift allowable revolution number on a basis of the deceleration rate of the vehicle and the gradient of the road surface in a case where the shifting operation unit receives the shifting operation that requests the downshifting during the deceleration of the vehicle.

12. The speed change control apparatus according to claim 7, further comprising:

an oil temperature detector configured to detect an oil temperature of the automatic transmission; and an acceptable cancellation time setting unit configured to set, on a basis of the oil temperature, an acceptable cancellation time in which the downshifting is allowed to be cancelled, wherein the speed change controller is configured to cancel the downshifting being executed in a case where: the state transition determining unit determines that the transition from the deceleration state to the acceleration state is made during the execution of the downshifting; and an elapsed time from a start of a process of the downshifting is equal to or shorter than the acceptable cancellation time.

13. The speed change control apparatus according to claim 12, wherein the acceptable cancellation time setting unit is configured to shorten the acceptable cancellation time as the oil temperature becomes higher.

14. The speed change control apparatus according to claim 13, wherein the acceptable cancellation time setting unit is configured to set the acceptable cancellation time on a basis of: the oil temperature; and a combination of the speed ratio at a start of the downshifting and the speed ratio at an end of the downshifting.

15. The speed change control apparatus according to claim 13, wherein the speed change controller is configured to perform one or both of issue of an engine output reduction request and upshifting of the automatic transmission, in a case where: the state transition determining unit determines that the transition from the deceleration state to the acceleration state is made during the execution of the downshifting; the acceptable cancellation time has been elapsed since the start of the process of the downshifting; and the engine revolution number is equal to or larger than predetermined revolution number, the engine output reduction request comprising a request to reduce output of the engine.

16. The speed change control apparatus according to claim 12, wherein the acceptable cancellation time setting unit is configured to set the acceptable cancellation time on a basis of: the oil temperature; and a combination of the speed ratio at a start of the downshifting and the speed ratio at an end of the downshifting.

17. The speed change control apparatus according to claim 12, wherein the speed change controller is configured to perform one or both of issue of an engine output reduction request and upshifting of the automatic transmission, in a case where: the state transition determining unit determines that the transition from the deceleration state to the acceleration state is made during the execution of the downshifting; the acceptable cancellation time has been elapsed since the start of the process of the downshifting; and the engine revolution number is equal to or larger than predetermined revolution number, the engine output reduction request comprising a request to reduce output of the engine.

18. The speed change control apparatus according to claim 7, further comprising a gradient acquiring unit configured to acquire a gradient of a road surface of a road on which the vehicle is traveling, wherein the allowable revolution number setting unit is configured to set the high-speed downshift allowable revolution number on a basis of the deceleration rate of the vehicle and the gradient of the road surface in a case where the shifting operation unit receives the shifting operation that requests the downshifting during the deceleration of the vehicle.

19. A speed change control apparatus for an automatic transmission configured to selectively switch between a plurality of speed change modes including an automatic speed change mode in which an automatic speed change is executed on a basis of a predetermined speed change characteristic and a manual speed change mode in which a manual speed change is executed on a basis of a shifting operation performed by a driver of a vehicle, the speed change control apparatus comprising:
- a shifting operation unit configured to receive the shifting operation performed by the driver while the manual speed change mode is being selected;
- a deceleration detector configured to detect a deceleration rate of the vehicle; and
- circuitry configured to
  - change a speed ratio of the automatic transmission on a basis of the shifting operation received by the shifting operation unit,
  - acquire a gradient of a road surface of a road on which the vehicle is traveling,
  - set high-speed downshift allowable revolution number on a basis of the deceleration rate of the vehicle and the gradient of the road surface in a case where the shifting operation unit receives the shifting operation that requests downshifting during deceleration of the vehicle, the high-speed downshift allowable revolution number comprising engine revolution number at which the downshifting is allowed to be executed during the deceleration of the vehicle, and
  - execute the downshifting in a case where: the shifting operation unit receives the shifting operation that requests the downshifting during the deceleration of the vehicle; and the engine revolution number becomes equal to or smaller than the high-speed downshift allowable revolution number.

20. A speed change control apparatus for an automatic transmission configured to selectively switch between a plurality of speed change modes including an automatic speed change mode in which an automatic speed change is executed on a basis of a predetermined speed change characteristic and a manual speed change mode in which a manual speed change is executed on a basis of a shifting operation performed by a driver of a vehicle, the speed change control apparatus comprising:
- a shifting operation unit configured to receive the shifting operation performed by the driver while the manual speed change mode is being selected;
- a deceleration detector configured to detect a deceleration rate of the vehicle; and
- circuitry configured to
  - change a speed ratio of the automatic transmission on a basis of the shifting operation received by the shifting operation unit,
  - set high-speed downshift allowable revolution number on a basis of the deceleration rate of the vehicle in a case where the shifting operation unit receives the shifting operation that requests downshifting during deceleration of the vehicle, the high-speed downshift allowable revolution number comprising engine revolution number at which the downshifting is allowed to be executed during the deceleration of the vehicle,
  - determine, on a basis of a driving state of the vehicle, whether the vehicle is making a transition from a deceleration state to an acceleration state,
  - execute the downshifting in a case where: the shifting operation unit receives the shifting operation that requests the downshifting during the deceleration of the vehicle; and the engine revolution number becomes equal to or smaller than the high-speed downshift allowable revolution number, and
  - cancel the downshifting being executed in a case where it is determined that the transition from the deceleration state to the acceleration state is made during execution of the downshifting.

\* \* \* \* \*